United States Patent
Zhang et al.

(10) Patent No.: US 11,804,905 B1
(45) Date of Patent: Oct. 31, 2023

(54) OPTICAL FULL-FIELD TRANSMITTER

(71) Applicant: CABLE TELEVISION LABORATORIES, INC., Louisville, CO (US)

(72) Inventors: Haipeng Zhang, Broomfield, CO (US); Mu Xu, Broomfield, CO (US); Zhensheng Jia, Superior, CO (US); Junwen Zhang, Shanghai (CN); Luis Alberto Campos, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/688,487

(22) Filed: Mar. 7, 2022

Related U.S. Application Data

(60) Provisional application No. 63/158,777, filed on Mar. 9, 2021, provisional application No. 63/156,990, filed on Mar. 5, 2021.

(51) Int. Cl.
*H04B 10/50* (2013.01)
*H04B 10/516* (2013.01)

(52) U.S. Cl.
CPC ......... *H04B 10/505* (2013.01); *H04B 10/504* (2013.01); *H04B 10/506* (2013.01); *H04B 10/5161* (2013.01)

(58) Field of Classification Search
None
See application file for complete search history.

(56) References Cited

U.S. PATENT DOCUMENTS

| | | | | |
|---|---|---|---|---|
| 6,335,819 B1* | 1/2002 | Cho | ...................... | H04B 10/299 |
| | | | | 359/333 |
| 7,379,669 B2* | 5/2008 | Kim | ................. | H04B 10/25752 |
| | | | | 398/76 |
| 7,483,640 B2* | 1/2009 | Miyazaki | ........... | H04B 10/5162 |
| | | | | 398/188 |
| 8,326,151 B2* | 12/2012 | Lee | ...................... | H04B 10/502 |
| | | | | 398/68 |
| 8,649,682 B2* | 2/2014 | Presi | ................... | H04J 14/0282 |
| | | | | 398/174 |
| 9,435,839 B2* | 9/2016 | Devgan | ..................... | G01J 1/42 |

(Continued)

OTHER PUBLICATIONS

Lu et al., Flexible high-order QAM transmitter using tandem IQ modulators for generating 16/32/36/64-QAM with balanced complexity in electronics and optics, OSA, 2013 (Year: 2013).*

*Primary Examiner* — Jai M Lee
(74) *Attorney, Agent, or Firm* — Cozen O'Connor

(57) ABSTRACT

An optical full-field transmitter (OFFT) includes a plurality of optical circulators and a polarization beam combiner. The plurality of optical circulators are fabricated on a silicon-on-insulator (SOI) substrate, where each of the optical circulators has (a) a first port that optically couples to a high-quality optical source, (b) a second port that optically couples to a child laser configured to receive amplitude modulation data, and (c) a third port optically coupled to a phase modulator that (i) is configured to receive a phase modulation data and (ii) includes an output port that outputs amplitude and phase modulated light. The polarization beam combiner receives the amplitude and phase modulated light from each of the optical circulators and outputs combined amplitude and phase modulated light.

4 Claims, 14 Drawing Sheets

(56) References Cited

U.S. PATENT DOCUMENTS

| | | | | |
|---|---|---|---|---|
| 9,880,351 B2* | 1/2018 | Chien | ............... | G02B 6/105 |
| 9,912,409 B2* | 3/2018 | Jia | ............... | H04B 10/63 |
| 10,623,104 B2* | 4/2020 | Zhou | ............... | H04B 10/502 |
| 10,944,478 B2* | 3/2021 | Zhang | ............... | H04B 10/504 |
| 11,309,970 B2* | 4/2022 | Woodward | ............... | H04B 10/70 |
| 11,418,263 B2* | 8/2022 | Zhang | ............... | H04B 10/25 |
| 2009/0016739 A1* | 1/2009 | Yu | ............... | H04B 10/25073 |
| | | | | 398/158 |
| 2009/0180502 A1* | 7/2009 | Byun | ............... | H04J 14/0282 |
| | | | | 359/344 |
| 2011/0150502 A1* | 6/2011 | Zhao | ............... | H01S 5/065 |
| | | | | 398/183 |
| 2014/0314108 A1* | 10/2014 | Anandarajah | ............... | H01S 5/065 |
| | | | | 372/20 |

* cited by examiner

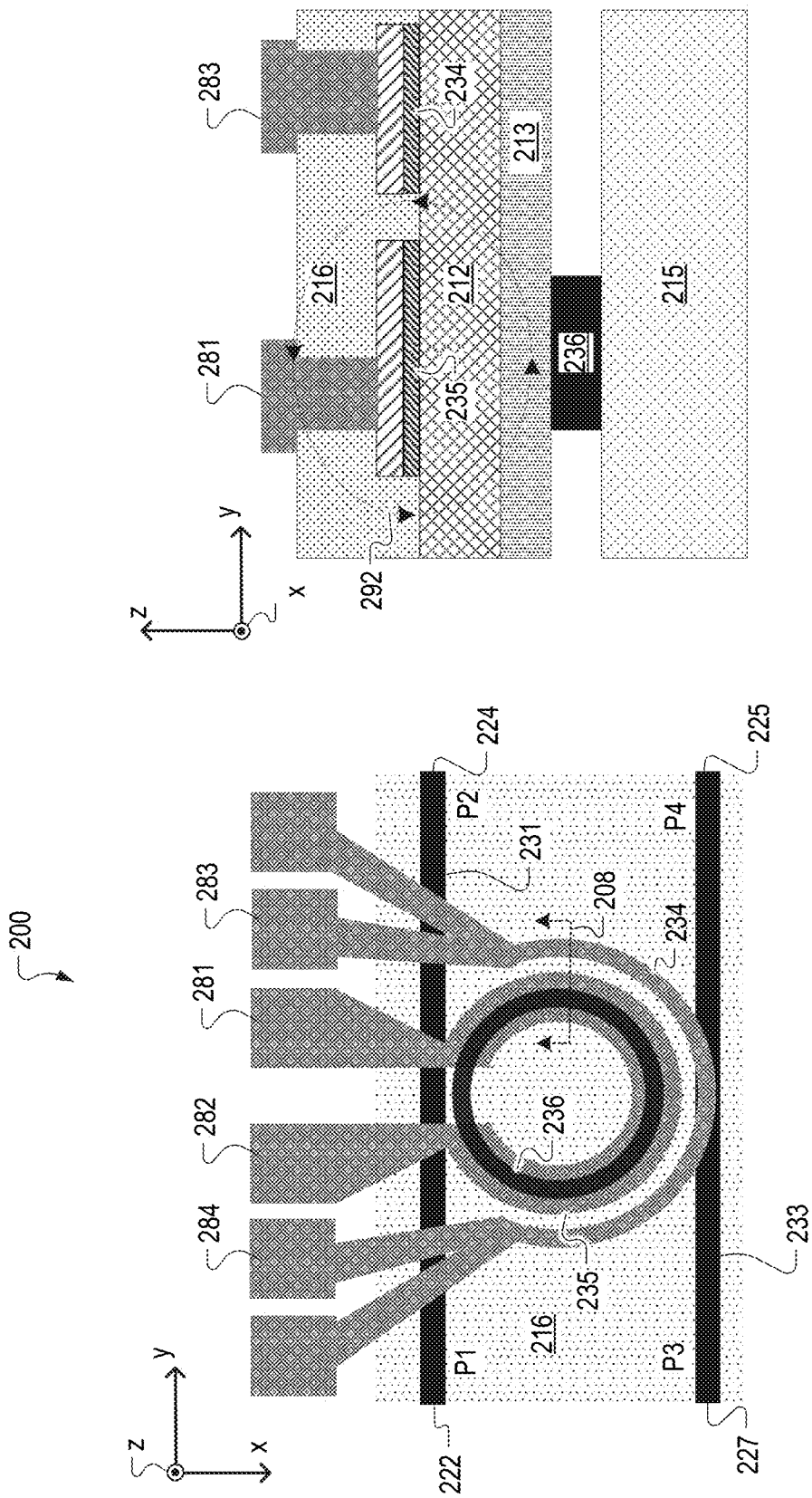

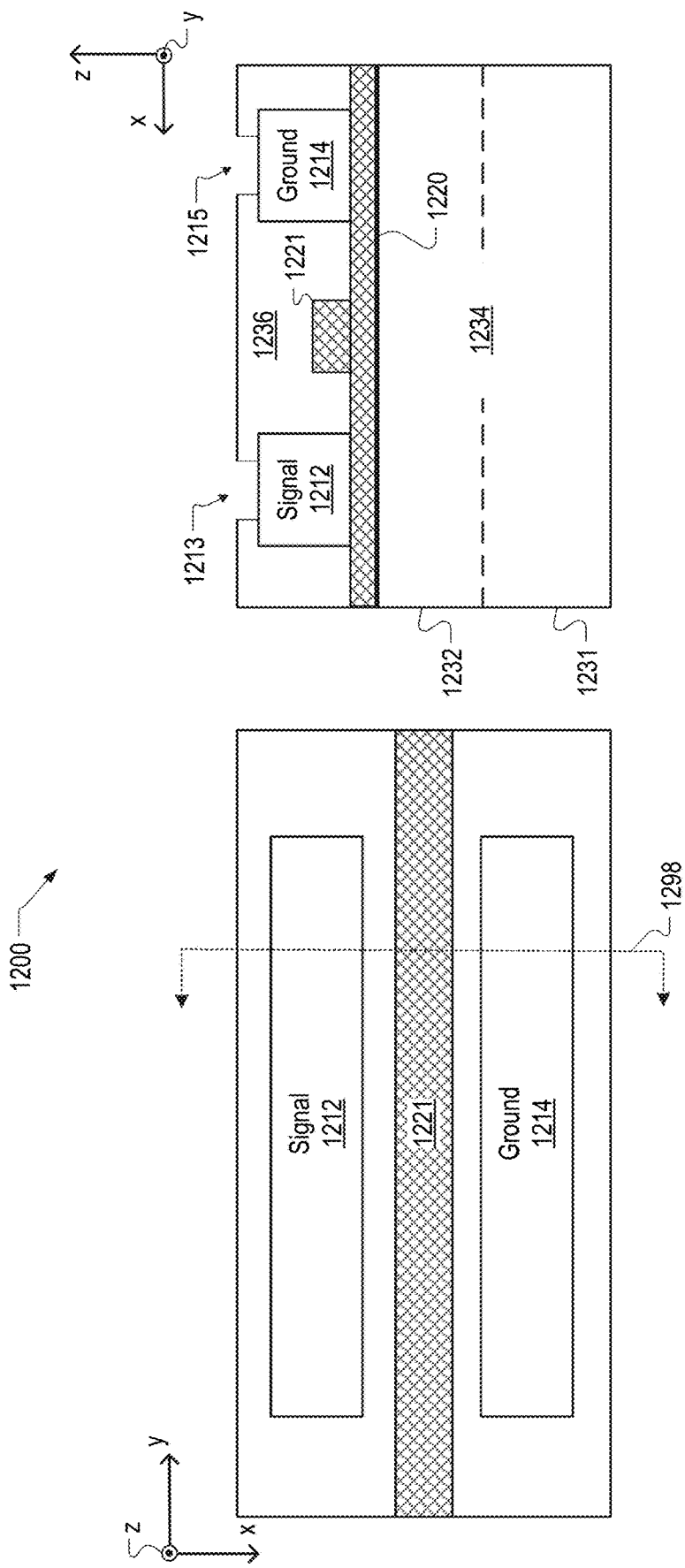

OPTICAL FULL-FIELD TRANSMITTER

RELATED APPLICATION

This application claims priority to U.S. Provisional Patent Application No. 63/156,990, filed Mar. 5, 2021, and to U.S. Provisional Patent Application No. 63/158,777, filed Mar. 9, 2021, both of which are incorporated herein by reference in their entirety.

BACKGROUND

A significant increase in data intensive applications and services such as high-definition video-on-demand, cloud computing/storage, Internet of Things, and Big Data, has resulted in continuously increasing demand for bandwidth and growing levels of data traffic at both residential areas and businesses. By prediction, the ever-increasing demand will eventually reach multi-gigabit/s speed per user. Wired access networks based on passive optical network (PON) technologies are dominant in meeting such high-capacity demands made by subscribers. However, limited performance of the direct modulation/detection technology currently used in optical networks restricts the data rate per user. As PON evolves towards 100 Gb/s and higher data rates, coherent optical access network technology attracts much attention because of its superior performance and vast potential. Compared with traditional direct modulation/detection systems that suffer from limited modulation bandwidth, short transmission distance, and poor received sensitivity, coherent optical access network technology offers high receiver sensitivity, inherent frequency selectivity, and linear field detection that enables full compensation of linear channel impairments. Additionally, this technology has potential for exceptionally high data throughput over a long distance (>50 km).

SUMMARY

Coherent optical injection-locking (COIL) is a 'laser-cloning' technique that allows a low-cost Fabry-Perot (FP) laser output a high-performance narrow linewidth optical source by injecting a high-quality light into its cavity. This is a promising low-cost alternative to using expensive external cavity lasers (ECL) in a coherent system. Embodiments disclosed herein describe an optical full-field transmitter (OFFT) based on COIL. The use of COIL in OFFT designs not only reduces laser and modulator cost but also significantly reduces optical insertion loss and modulation loss by replacing parallel Mach-Zehnder modulator (MZM) with a combination of phase modulator and directly modulated COIL FP laser. In addition, embodiments disclosed herein illustrate photonics integration solutions that further reduce the cost of implementing COIL based OFFT and other types of transmitters in optical access networks while reducing device footprint and power consumption.

In a first embodiment, an optical full-field transmitter (OFFT) includes a plurality of optical circulators and a polarization beam combiner. The plurality of optical circulators are fabricated on a silicon-on-insulator (SOI) substrate, where each of the optical circulators has (a) a first port that optically couples to a high-quality optical source, (b) a second port that optically couples to a child laser configured to receive amplitude modulation data, and (c) a third port optically coupled to a phase modulator that (i) is configured to receive a phase modulation data and (ii) includes an output port that outputs amplitude and phase modulated light. The polarization beam combiner receives the amplitude and phase modulated light from each of the optical circulators and outputs combined amplitude and phase modulated light.

In a second embodiment, an optical circulator includes a plurality of silicon waveguides, a plurality of silicon ring resonators, a magneto-optic film, a magneto-optic garnet layer, and a plurality of metal strips. The plurality of silicon waveguides is patterned on a SOI substrate, where each silicon waveguide of the plurality of waveguides is substantially linear and has first and second ends. The plurality of silicon ring resonators is also patterned on the SOI substrate. The magneto-optic film is bonded on top of the plurality of silicon waveguides and the plurality of silicon ring resonators. The magneto-optic garnet layer is on the magneto-optic film. The plurality of metal strips is patterned on the magneto-optic garnet layer.

BRIEF DESCRIPTION OF THE FIGURES

FIGS. 2A and 2B illustrate an optical circulator, in a single ring resonator configuration, in an embodiment.

FIGS. 10A and 10B illustrate one phase modulator, with an integrated Lithium Niobate layer, in an embodiment.

DETAILED DESCRIPTION OF THE EMBODIMENTS

The term semiconductor substrate may refer to substrates formed of one or more semiconductors such as silicon, silicon-germanium, germanium, gallium arsenide, indium gallium arsenide, and other semiconductor materials known to those of skill in the art. The term semiconductor substrate may also refer to a substrate, formed of one or more semiconductors, subjected to previous process steps that form regions and/or junctions in the substrate. A semiconductor substrate may also include various features, such as doped and undoped semiconductors, epitaxial layers of silicon, and other semiconductor structures formed upon the substrate.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meanings.

Figure 1A:
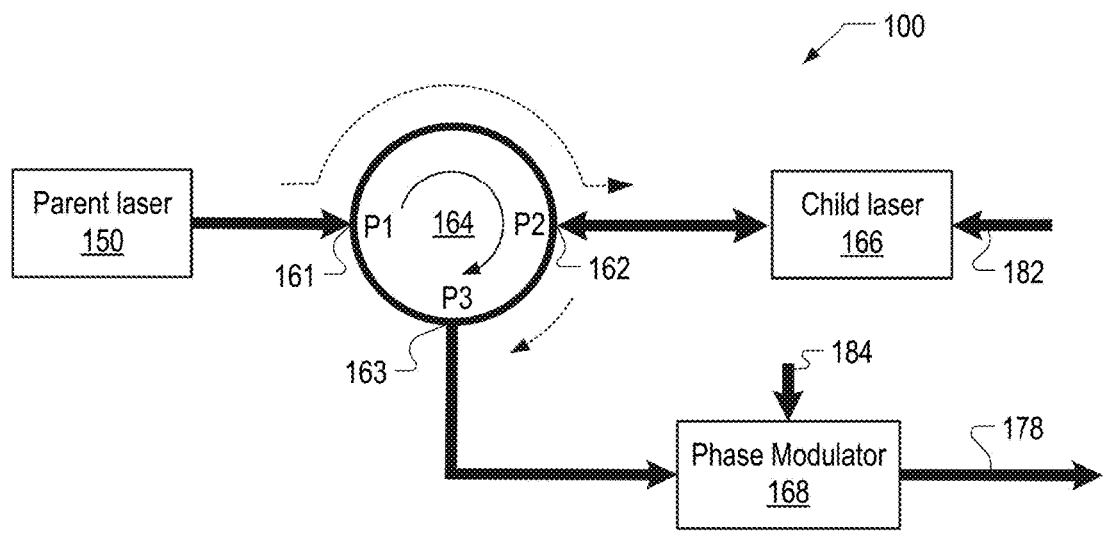
FIG. 1A illustrates one optical full-field transmitter, in a single polarization configuration, in an embodiment.

As described herein, critical functional components of an integrated optical full-field transmitter (OFFT) include a high-quality external cavity laser (ECL), one or more optical circulators, phase modulators, and child Fabry-Perot (FP) lasers. OFFTs may be fabricated on a single chip through a silicon hybrid integration process. FIG. 1A illustrates one example OFFT 100, in a single polarization configuration. OFFT 100 includes a parent laser 150, a child laser 166, an optical circulator 164, and a phase modulator 168. Parent laser 150 may be a high quality ECL for injection-locking child laser 166. In embodiments, child laser 166 is a FP laser diode (FD-LD). Optical circulator 164 includes (i) a first port (P1) 161 optically coupled to parent laser 150, (ii) a second port (P2) 162 optically coupled to child laser 166, and (iii) a third port (P3) 163 optically coupled to phase modulator 168. Optical circulator 164 routes beams from parent laser 150 to child laser 166 and from child laser 166 to phase modulator 168. Child laser 166 may receive an amplitude modulation data 182 to control the amplitude modulation of the output light. Phase modulator 168 may receive a phase modulation data 184 to control the phase modulation of the received amplitude modulated light from child laser 166. In one example of operation, high quality narrow linewidth light from parent laser 150 is injected into a cavity of child laser 166 causing child laser 166 to produce a high-power narrow linewidth light having substantially the same optical characteristics as optical characteristics of the high-quality narrow linewidth light from parent laser 150. Amplitude modulation data 182 controls the amplitude modulation of the high-power narrow linewidth light from child laser 166. The amplitude modulated light from child laser 166 is then received by phase modulator 168, which controls the phase modulation of the received amplitude modulated light using the received phase modulation data 184. The resulting amplitude and phase modulated light 178 is the output of OFFT 100.

Figure 1B:
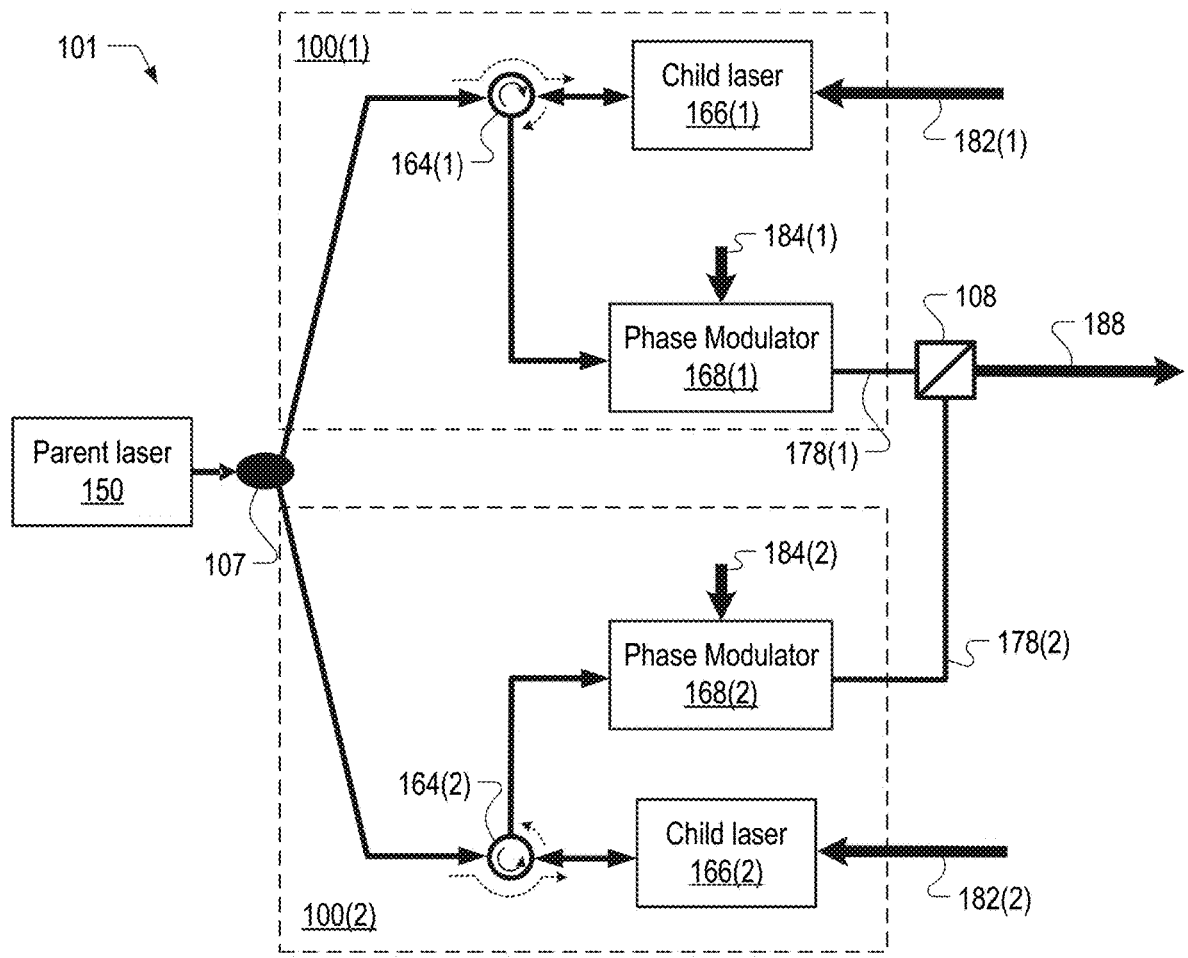
FIG. 1B illustrates another optical full-field transmitter, in a dual polarization configuration, in an embodiment.

While OFFT 100 is configured for a single polarization system, it may also be used in a dual polarization configuration. FIG. 1B illustrates another OFFT 101, in a dual polarization configuration. OFFT 101 includes a plurality of optical circulators, which includes OFFTs 100(1) and OFFT (2), and a polarization beam combiner (PBC) 108. The plurality of optical circulators is fabricated on a silicon-on-insulator (SOI) substrate with each optical circulator 164 having (i) first port 161 optically coupled to parent laser 150, (ii) second port 162 optically coupled to child laser 166, where the child laser configured to receive an amplitude modulation data, and (iii) third port 163 optically coupled to phase modulator 168, which is configured to receive a phase modulation data. Phase modulator 168 includes an output port for outputting an amplitude and phase modulated light 178 for each OFFT 100. PBC 108 is configured to receive the amplitude and phase modulated light 178 from each optical circulator 164 and output a combined amplitude and phase modulated light 188, which may be in a dual polarization state. OFFT 101 may also include a parent laser 150 for each OFFT 100. However, OFFT 101 may also share parent laser 150 among the plurality of OFFTs including OFFTs 100(1) and 100(2). For example, OFFT 101 may include an optical splitter 107 that splits light from parent laser 150 to feed both OFFTs 100(1) and 100(2).

In the following sections, critical components of an OFFT, namely an optical circulator, an external cavity laser, and a phase modulator, are detailed for photonic integration. In particular, the optical circulator and its example applications in related optical and network devices are disclosed. The examples disclosed herein are not meant to be exhaustive but rather highlight some of the advantages of using an optical circulator in an integrated photonics solution.

Integrated Optical Circulator

An optical circulator, such as optical circulators 164 in FIGS. 1A and 1B, is a three-or four-port non-reciprocal optical device designed so that optical signals entering any ports exits from the next, as in a traffic roundabout for cars. Typically, discrete optical circulators break reciprocity by utilizing magneto-optically active materials. Such discrete devices are usually bulky (several centimeters long) and expensive, which increases the cost and footprint of the coherent system in access networks significantly.

Embodiments disclosed hereinbelow illustrate use of an optical circulator in an integrated photonics solution that may be utilized in coherent optical and network devices with significant reduction in terms of footprint and cost. Advantageously, these integrated designs also reduce the system complexity by eliminating the need for a large amount of input and output fibers and interconnects.

FIGS. 2A and 2B illustrate an optical circulator 200, in a single ring resonator configuration. Optical circulator 200 may for example be used as optical circulators 164 of FIGS. 1A and 1B. FIGS. 2A and 2B denote axes x, y, and z, where the z-axis is orthogonal to a plane formed by orthogonal axes x and y. Herein, the x-y plane is formed by orthogonal axes x and y and is referred to as a horizontal plane. Also, herein, a width refers to an object's extent along the x axis, a depth refers to an object's extent along the y axis, a thickness (or thinness) refers to an object's extent along the z-axis, and vertical refers to a direction along the z-axis. Unless otherwise specified, heights of objects herein refer to the object's extent along axis z. Also, herein, "above" refers to a relative position along the z-axis in the positive direction and "below" refers to a relative position along the z-axis in the negative direction.

FIG. 2A also denotes a section line 208, which indicates the location of the orthogonal cross-sectional side view illustrated in FIG. 2B, which is parallel to y-z plane. FIGS. 2A and 2B are best viewed together in the following description. Optical circulator 200 includes one or more silicon waveguides 231 and 233, a silicon ring resonator 236, a magneto-optic film 213, a magneto-optic garnet layer 212, and metal strips 234 and 235. Silicon waveguide 231 and 233 may be patterned on a silicon-on-insulator (SOI) substrate 215. Silicon ring resonator 236 may also be patterned on SOI substrate 215. Magneto-optic film 213 may be bonded on top of silicon waveguides 231 and 233 and silicon ring resonator 236 in z-direction. Magneto-optic garnet layer 212 may be on top of magneto-optic film 213. Metal strips 234 and 235 may be patterned on top of magneto-optic garnet layer 212. Metal strips 234 and 235 form a concentric circular pattern above silicon ring resonator 236 with metal strip 235 forming a first circular pattern having a radius equal to a radius of silicon ring resonator 236 and metal strip 234 forming a second circular pattern having a radius larger than a radius of silicon ring resonator 236.

Metal strip 235 has external electrical connections 281 and 282 at the ends. Metal strip 234 has external electrical connections 283 and 284 at the ends. In embodiments, metal strip 235 is made from one of Ti/Au, Ti/Pt, and Al. When powered, metal strip 235 generates a magnetic field 292 above silicon ring resonator 236 and produces heat. Metal strip 234, which may be made from Ti/Pt, has a linear response to a temperature change and acts as a resistance temperature detector (RTD). Using the RTD property of metal strip 234, the temperature and magnetic field generated by metal strip 235 may be controlled for a stable operation of optical circulator 200.

By applying magnetic field 292, for example by providing current through metal strip 235 in a positive x-direction in FIG. 2B, with respect to the direction of optical field propagation, the symmetry of silicon ring resonator 236 is broken by the non-reciprocal phase shift (NRPS) effect. Once the symmetry is broken, the clockwise and the counterclockwise propagation constants for the optical field polarized in transverse magnetic ($TM_0$) mode may be differentiated significantly, resulting in a different resonant wavelength for the two propagating directions. As a result, the different frequency response of silicon ring resonator 236 filters out the backward light and provides circulating functions. An optical circulator, such as optical circulator 200, with a single ring resonator design may have a channel isolation ratio of 9.15 dB at 1550 nm.

Optical circulator 200 includes optical ports P1 222 and P2 224, which are two ends of a silicon waveguide 231. Optical circulator 200 may also include at least one of optical ports P3 227 and P4 225. Optical ports P3 227 and P4 225 may be the two ends of silicon waveguide 233. Optical circulator 200 may be fabricated using a standard process for fabricating a complementary metal-oxide-semiconductor (CMOS). In embodiments, silicon waveguides 231 and 233 and silicon ring resonator 236, which may be patterned on a silicon-on-insulator (SOI) substrate 215, has a thickness of approximately 220 nm in z-direction. By utilizing direct wafer bonding approach, a magneto-optic film 213 may be grown on a magneto-optic garnet layer 212. Magneto-optic film 213 may be Ce:YIG, and Magneto-optic garnet layer 212 may be a [Ca, Mg, Zr]-substituted gadolinium gallium garnet (SGGG) layer. Magneto-optic film 213 may then be bonded onto patterned SOI substrate 215, followed by annealing. In embodiments, magneto-optic garnet layer 212 is thinned to a few micrometers using polishing. Metal strips 234 and 235 may then be patterned on the back side of magneto-optic garnet layer 212 through metal e-beam evaporation and liftoff process. Then a SiO2 layer 216 is deposited covering metal strips 234 and 235.

Figure 2C:
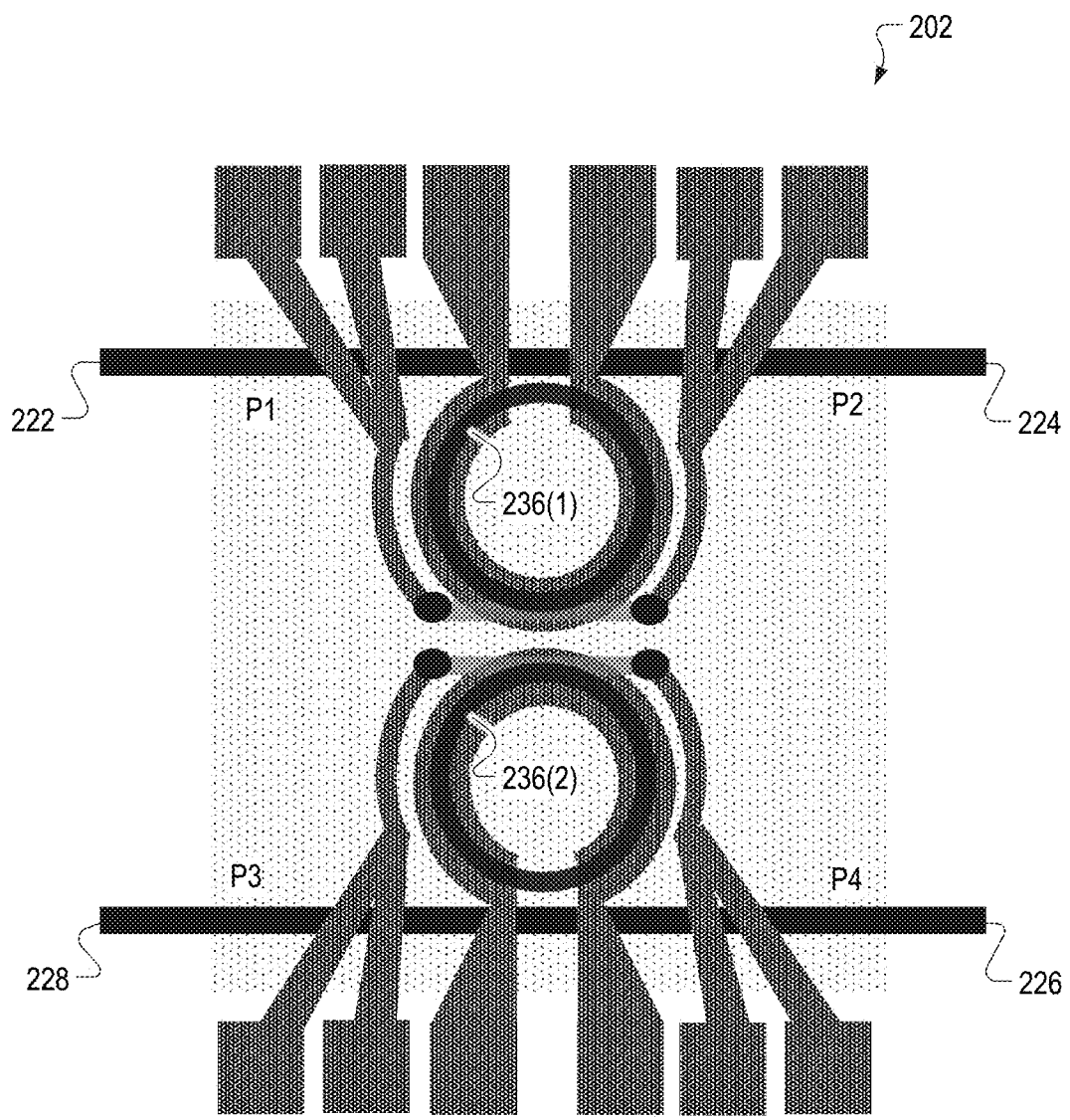
FIG. 2C illustrates another optical circulator, in a double ring resonator configuration, in an embodiment.

FIG. 2C illustrates another optical circulator 202, in a double ring resonator configuration. Optical circulator 202 may be formed by optically coupling two optical circulators 200. Optical circulator 202 includes two silicon ring resonators 236(1) and 236(2), ports P1 222 and P2 224 and may include at least one of ports P3 228 and P4 226. Advantageously, by utilizing double ring resonator design, the optical isolation and the isolation bandwidth may be effectively enlarged. As a result, optical circulator with a double ring resonator design, such as optical circulator 202 may have a channel isolation ratio of 18.3 dB at 1550 nm.

Integration of Optical Circulator in OIL Systems

Figure 3:
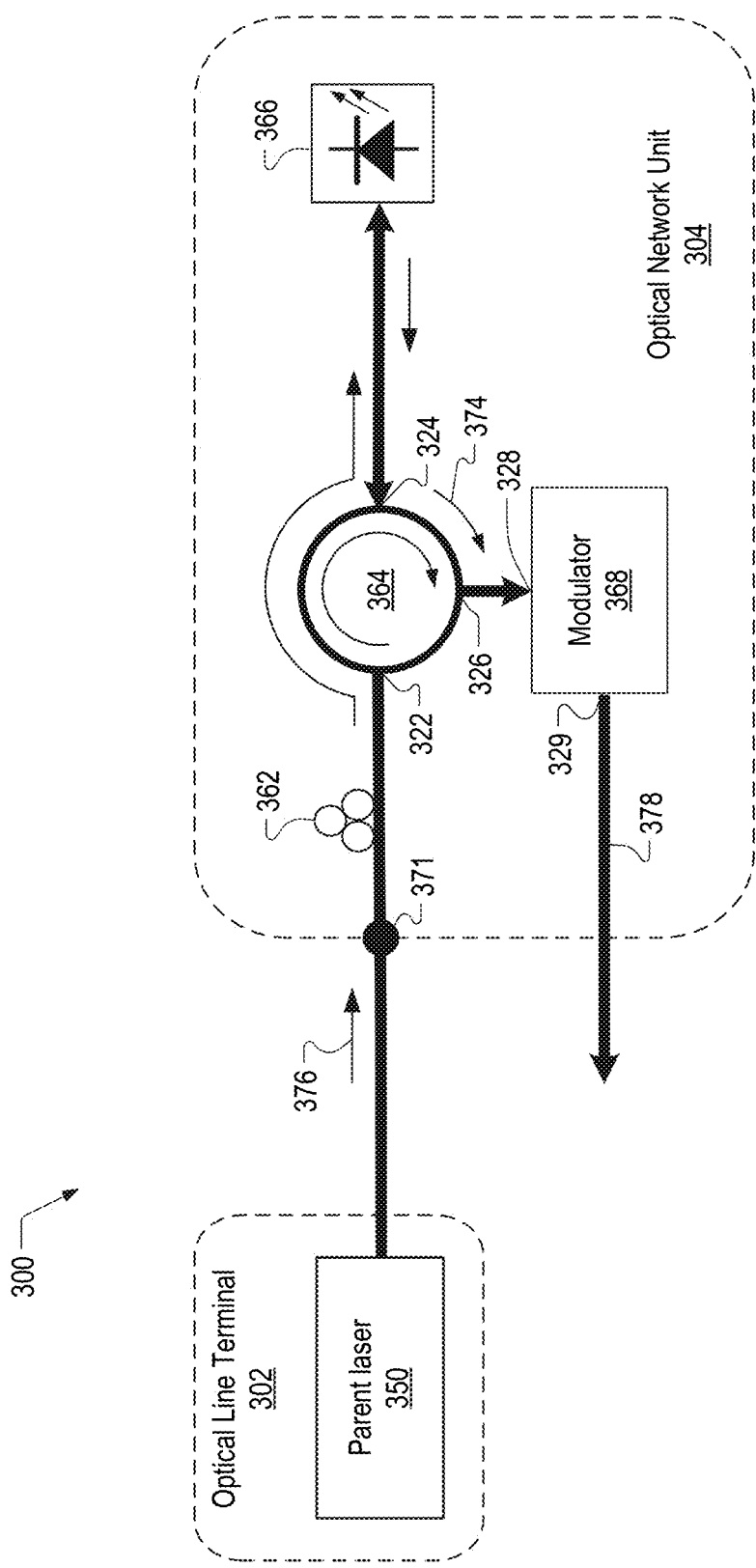
FIG. 3 illustrates an optical injection locking system, in a point-to-point configuration, in an embodiment.
Figure 4:
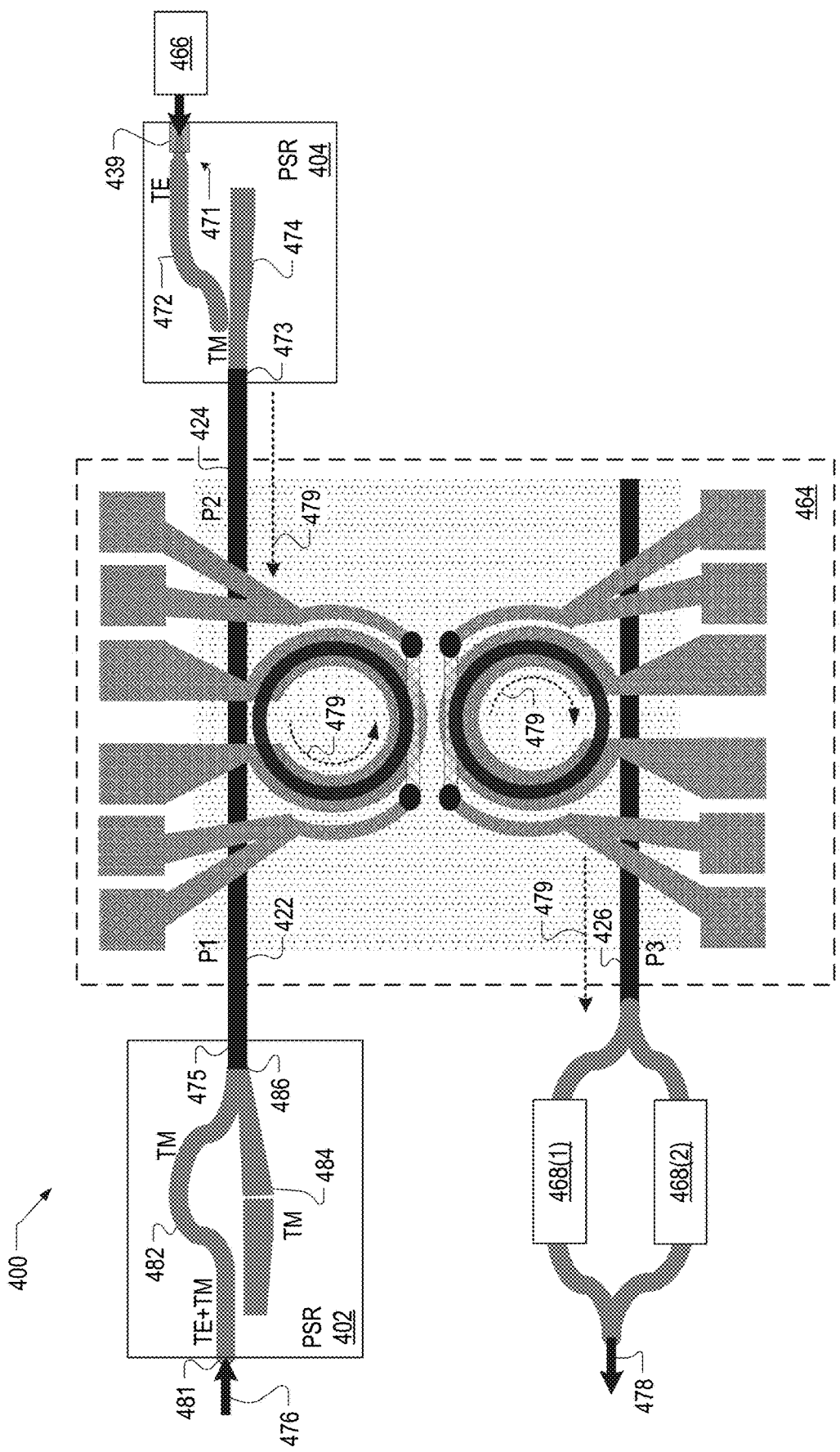
FIG. 4 illustrates an implementation of an optical circulator in an optical injection locking system, in an embodiment.
Figure 5:
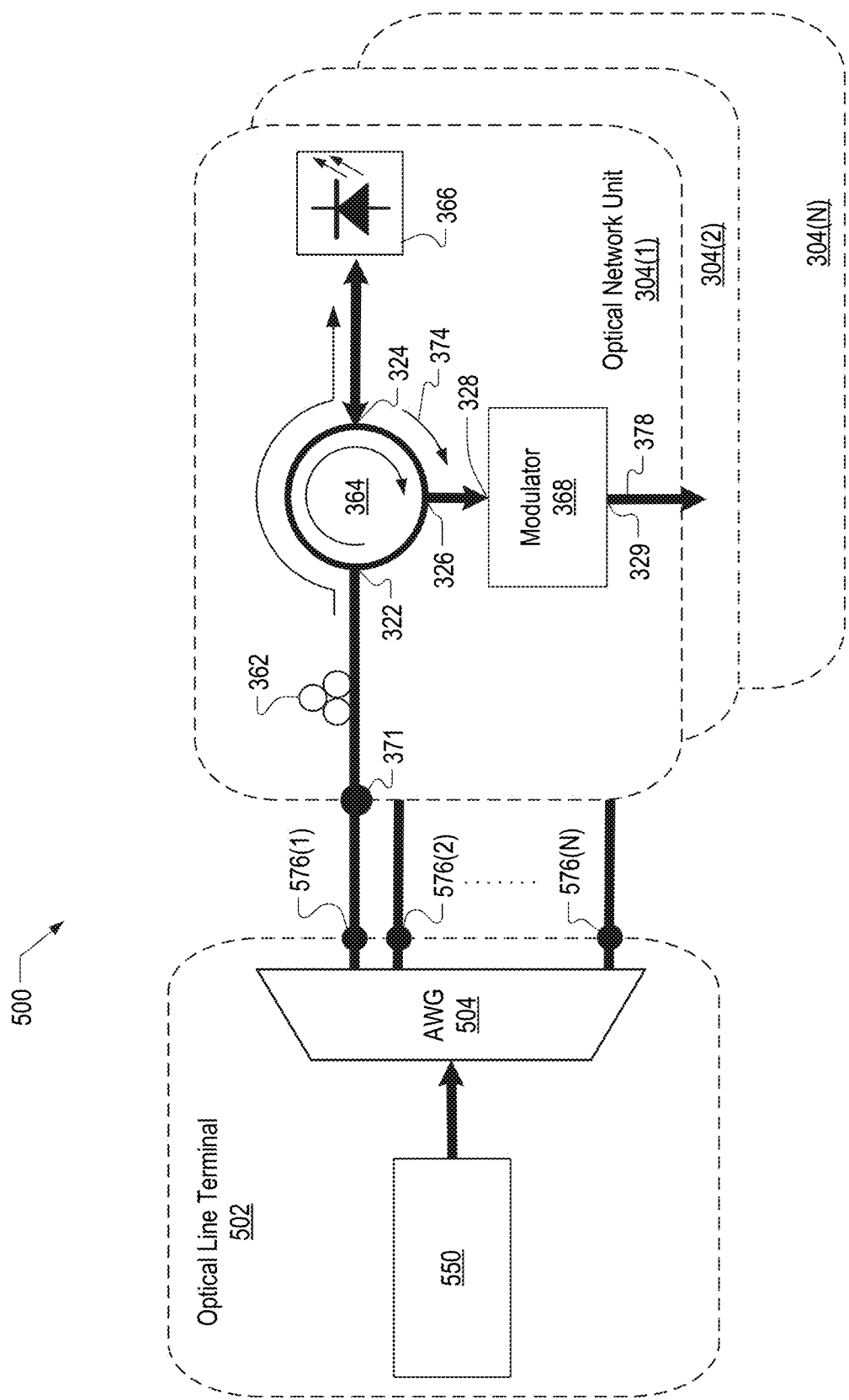
FIG. 5 illustrates another optical injection locking system, in a point-to-multipoint configuration, in an embodiment.

The first example application of the optical circulator is an optical injection locking (OIL) system. OIL is a technique that causes low-quality child lasers (e.g., child laser 166 in FIGS. 1A and 1B) to output a high-quality narrow bandwidth optical signal similar to high-performing lasers by injection locking light from a high-quality parent laser (e.g., parent laser 150 in FIGS. 1A and 1B) into resonators of the low-quality child lasers. The injection locked child laser behaves like a high-quality laser and may be a cost-effective solution in coherent optical systems. An OIL system may be implemented in a point-to-point (P2P) or a point-to-multi-point (P2MP) configuration. FIGS. 3 and 5 illustrate OIL systems, in a P2P configuration and P2MP configuration, respectively. FIG. 4 illustrates an implementation of an optical circulator in either configuration.

FIG. 3 illustrates an OIL system 300 in a P2P configuration. OIL system 300 includes an optical line terminal (OLT) 302 and an optical network unit (ONU) 304. OLT 302 may be located at an optical hub or at a central office (CO). OLT 302 includes a parent laser 350. In a coherent OIL (COIL) system, parent laser 350 may be a tunable ECL with C-band coverage to meet the requirement for the narrow frequency linewidth. ONU 304 includes an optical circulator 364, an input port 371, a child laser 366, and a modulator 368. Optical circulator 364 is an example of optical circulator 202 in FIG. 2C. Input port 371 is optically coupled to a first port 322 of optical circulator 364 and is configured to receive light from an optical line terminal 302. Child laser 366, which may be a FP laser diode (LD), is optically coupled to a second port 324 of optical circulator 364. Modulator 368 includes an input port 328 optically coupled to a third port 326 of optical circulator 364 and having a light output port 329. ONU 304 may also include a polarization controller 362, which controls the polarization of an injected light 376 for maximizing injection coupling efficiency. In one example of operation, optical circulator 364 routes injected light 376 into the cavity of child laser 366. Optical circulator 364 then routes an output light 374 of child laser 366 into input port 328 of modulator 368 that may introduce modulation in output light 374 of child laser 366 and output a modulated light 378. In an example application, since a COIL system locks a semiconductor laser such as child laser 366 to the frequency and phase of an externally injected optical signal such as injected light 376, a low-cost multimode FP laser may be used as child laser 366 in a single mode operation by injecting a high-quality single-mode light from parent laser 350 into its cavity.

FIG. 4 illustrates an implementation of an optical circulator 464 in an OIL system 400. Integrated optical circulator 464 and OIL system 400 are respective examples of optical circulator 202 and OIL system 300. OIL system 400 may be implemented in ONU 304 using hybrid photonic integration. Optical circulator 464 may include a coupled ring resonator structure, an example of optical circulator 202 in FIG. 2C, and is favored in OIL system 400 for the superior performance in channel isolation and bandwidth. In embodiments, optical circulator 464 includes ports P1 422, P2 424, and P3 426, which are respective examples of ports P1 222, P2 224, and P3 228.

OIL system 400 also includes a first polarization splitter rotator (PSR) 402 and a second PSR 404. First PSR 402 controls the polarization of injected light 476 by converting injected light 476 into $TM_0$ mode and couples a converted light 475 to port P1 422 of optical circulator 464. First PSR 402 may be fabricated on the SOI waveguide layer (e.g., the same layer as silicon waveguide 231 in FIG. 2B). First PSR 402 includes an input port 481, a narrow waveguide 484, a tapered waveguide 482, and an exit port 486. Narrow waveguide 484 and tapered waveguide 482 may be formed of silicon. Injected light 476 is coupled to input port 481 of first PSR 402. The design of first PSR 402 is based on a tapered directional coupler (DC), which couples in parallel a narrow waveguide 484 to a wide tapered waveguide 482. The strong cross-polarization coupling between two waveguides results in (i) the transverse electric ($TE_0$) part of injected light 476 coupling to $TM_0$ mode in tapered waveguide 482 and exiting from an exit port 486, and (ii) the $TM_0$ part of injected light 476 propagating along the narrow waveguide 484 and exiting from exit port 486. The output lights from the two waveguides couple together as a $TM_0$ converted light 475 and enter port P1 422 of optical circulator 464. As with optical circulators 200 and 202, optical circulator 464 has a magneto-optic film (e.g., magneto-optic film 213 in FIG. 2B) bonded on SOI waveguides and is optimized for $TM_0$ mode.

Second PSR 404 includes an input port 471, an exit port 473, a tapered waveguide 472, and a narrow waveguide 474. Waveguides 472 and 474 may be formed of silicon. A child laser 466, which may be a FP-LD, is coupled to input port 471 through a spot size converter (SSC) 439. Exit port 473 is coupled to port P2 424 of optical circulator 464. Based on similar principle as above, $TM_0$ mode of optical circulator 464 may be converted to $TE_0$ mode to match the guided mode of child laser 466. Optical circulator 464, second PSR 404, and child laser 466, which is formed of indium phosphide, may be integrated together by butt coupling through tapered waveguide 472. The injection-locked output of child laser 466 follows a path 479 and is routed to port P3 426, followed by a coupling to one or more coherent in-phase/quadrature (I/Q) modulators 468 to generate injection locked light 478. In fabrication, silicon photonics I/Q modulators may be directly integrated with optical circulator 464. InP-based I/Q modulators may also be utilized by using hybrid integration.

While OIL systems 300 and 400 depict example use of optical circulators in a point-to-point (P2P) scenario, optical circulators may also be used in point-to-multipoint (P2MP) applications. FIG. 5 illustrates another OIL system 500, in a point-to-multipoint configuration. OIL system 500 includes an optical circulator 364. Optical circulator 364 may be implemented by using any of optical circulators 200, 202, 364, and 464.

OIL system 500 includes a plurality of optical network units 304 and an optical line terminal 502. Optical line terminal 502 includes an optical frequency comb source 550, a silicon arrayed wavelength grating (AWG) 504, and a plurality of output ports 576. Optical frequency comb source 550 may generate multiple frequency tones. AWG 504 is configured to separate the multiple frequency tones into a plurality of separated frequency tones. Plurality of output ports 576 has each output port 576(0, where i is a positive integer not more than N, configured to send the separated frequency tone of the plurality of separated frequency tones to a corresponding optical network unit 304(i).

In one example of operation, optical frequency comb source 550 generates multiple frequency tones. In embodiments, channel spacing between adjacent frequency tones are 25 GHz, 12.5 GHz, or 6.25 GHz. The generated frequency tones are then separated by AWG 504. Each separated frequency tone is optically coupled to a corresponding optical network unit 304(i) and is used to injection lock child laser 366.

Figure 6:
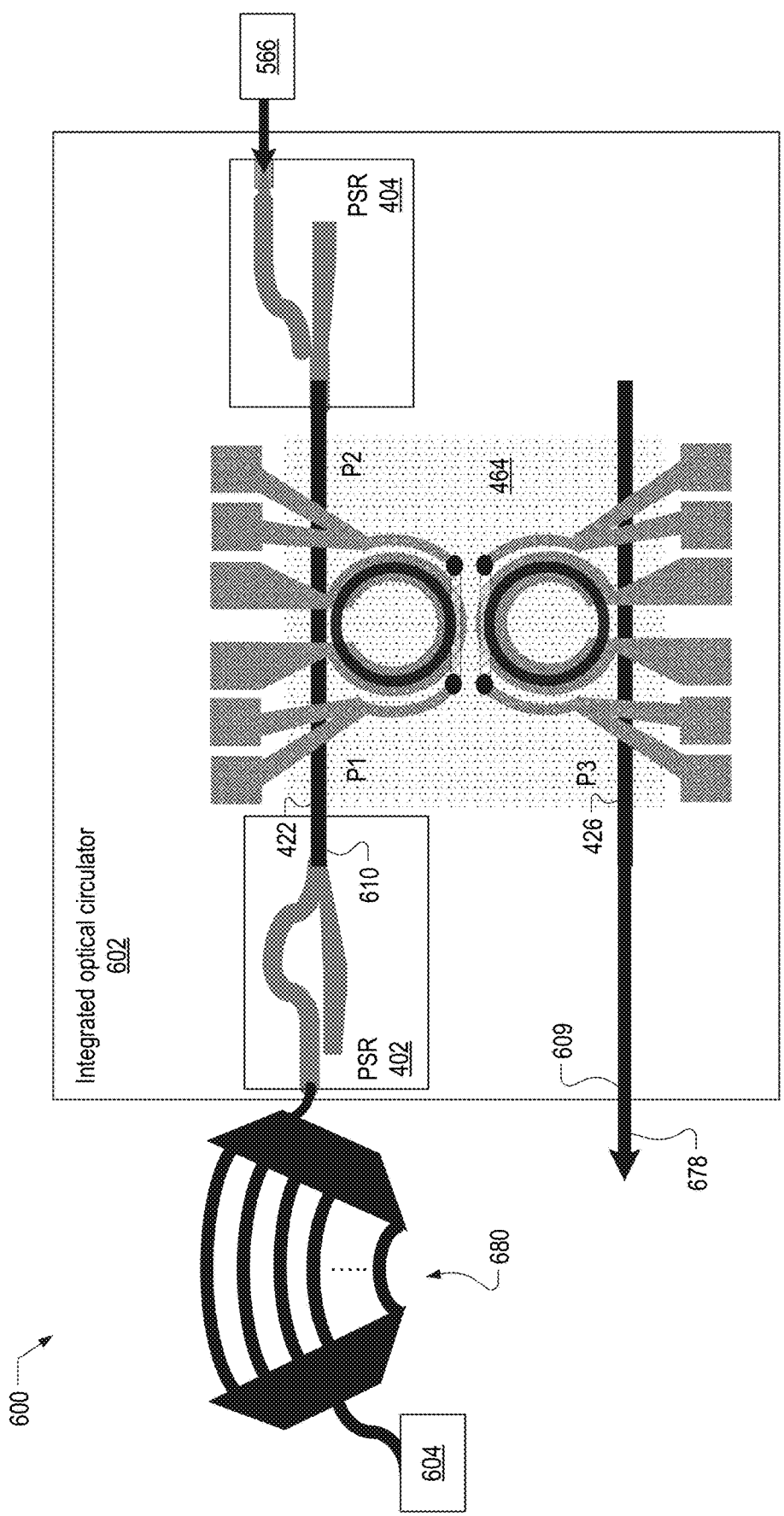
FIG. 6 illustrates another optical injection locking system, in a point-to-multipoint configuration, in an embodiment.

FIG. 6 illustrates another OIL system 600, in a point-to-multipoint configuration. OIL system 600 may also be fabricated on a SOI substrate. OIL system 600 includes an integrated optical circulator 602, which may include optical circulator 464 of FIG. 4. Integrated optical circulator 602 also includes an output port 609, PSRs 402 and 404. Output port 609 is optically coupled to port P3 426 of optical circulator 464. In embodiments, integrated optical circulator 602 is formed of silicon photonics. OIL system 600 also includes an optical frequency comb source 604, a dual-AWG 680, and a child laser 566. One output of dual-AWG 680 is coupled to first PSR 402 of integrated optical circulator 602. First PSR 402 converts the polarization mode of the guided light from dual-AWG 680 into a guided $TM_0$ light 610, which enters optical circulator 464 at port P1 422 and subsequently injection locks child laser 566. Second PSR 404 may be used to optimize the polarization of guided $TM_0$ light 610 to match the cavity mode of child laser 566. Injection locked light 678, which exits integrated optical circulator 602 via output port 609, may be modulated by modulating child laser 566 or by coupling an external modulator at output port 609. In fabrication, integrated optical circulator 602 may be butt coupled with child laser 566, which may be an InP FP laser, through mode size converters used in hybrid photonic integration.

Integration of Optical Circulator in Full-Duplex Coherent Optics Systems

Figure 7:
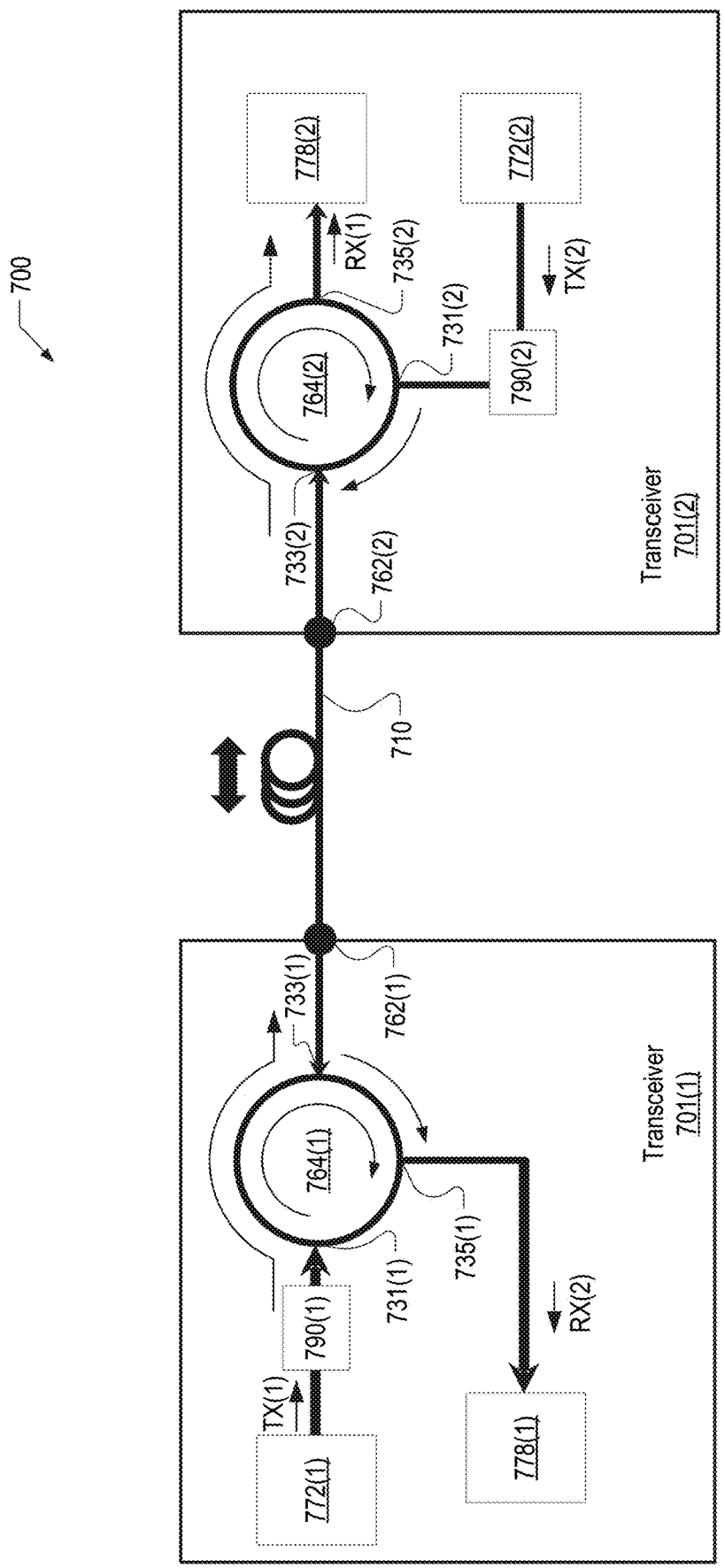
FIG. 7 illustrates a full-duplex coherent optical system, in a single polarization configuration, in an embodiment.

The second example application of the optical circulator is a full-duplex coherent optics (FDCO) technology, in which a single fiber is used to transmit both upstream and downstream signals. FDCO technology may be implemented in a FDCO transceiver in a single polarization or a dual polarization configuration. Both configurations, each using an optical circulator, are disclosed below. FIG. 7 illustrates a FDCO system 700, in a single polarization configuration. FDCO system 700 may include two or more FDCO transceivers 701. For brevity, only two FDCO transceivers are shown in FIG. 7. FDCO transceivers 701(1) and 701(2) may be connected using a fiber 710. FDCO transceiver 701 includes an optical circulator 764. Optical circulator 764 includes a first port 731, a second port 733, and a third port 735. First port 731 is configured to receive a transmitted light TX from a transmit source 772. Second port 733 is optically coupled to an input/output (I/O) port 762 that may send and receive light through fiber 710. Third port 735 is optically coupled to a coherent receiver 778, configured to receive a received light RX. Coherent receiver 778 may include a photodetector that converts RX into an electrical signal. FDCO transceiver 701 may also include a polarization controller 790 disposed between transmit source 772 and first port 731 of optical circulator 764 and configured to control a polarization of transmitted light TX entering first port 731.

In one example of operation of a bi-directional transmission, TX(1) from transmit source 772(1) enters first port 731(1) of optical circulator 764(1) in transceiver 701(1) and exits through second port 733(1). TX(1) is received by transceiver 701(2) and enters second port 733(2) of optical circulator 764(2), which then exits through third port 735(2) and is received by coherent receiver 778(2) as RX(1). In a reverse operation, TX(2) from transmit source 772(2) in transceiver 701(2) enters first port 731(2) of optical circulator 764(2) and exits through second port 733(2). TX(2) is subsequently received by transceiver 701(1) and enters second port 733(1) of optical circulator 764(1). TX(2) then exits through third port 735(1) and is received by coherent receiver 778(1) as RX(2). In general, one or more optical circulators may be used in each FDCO transceiver to re-route the optical path in different directions, thereby allowing a bi-directional transmission in a single fiber between any two FDCO transceivers in the system. Additionally, P2P FDCO systems, such as FDCO system 700, may be used in P2MP FDCO systems by adding AWGs and coherent modulators, as described in examples of FIGS. 5 and 6.

Figure 8:
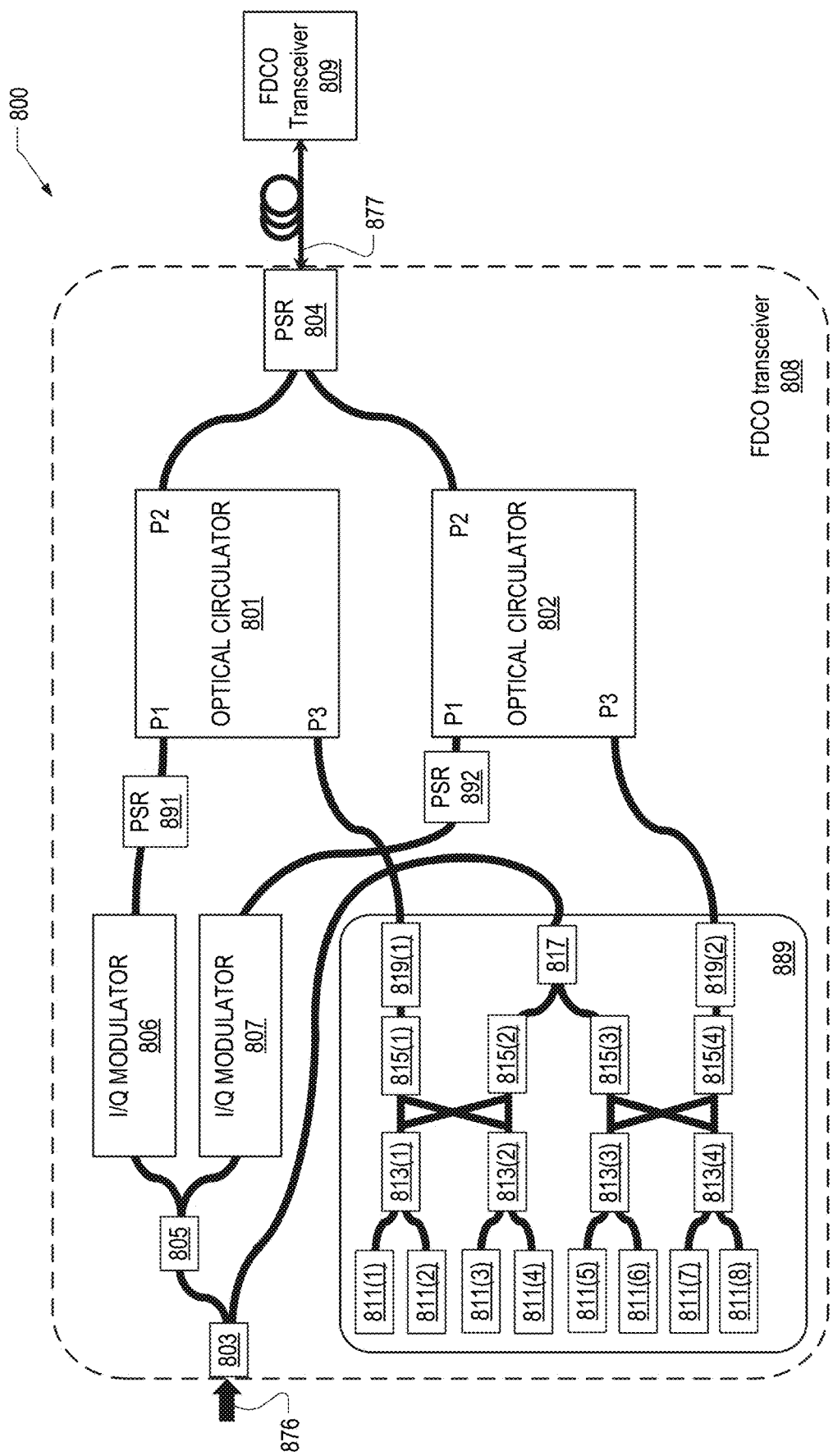
FIG. 8 illustrates another full-duplex coherent optical system, in a dual polarization configuration, in an embodiment.

FIG. 8 illustrates another FDCO system 800, in a dual polarization configuration. FDCO system 800 may include two or more FDCO transceivers, of which only two FDCO transceivers 808 and 809 are shown for brevity. FDCO transceiver 808 is shown in detail as an example of FDCO transceivers in a dual polarization configuration. FDCO transceiver 808 may be implemented in a complete photonic integration on a SOI platform. FDCO transceiver 808 includes two optical circulators 801 and 802. Optical circulators 801 and 802 are examples of any optical circulator 200 or 202 in FIGS. 2A, 2B and 2C. FDCO transceiver 808 also includes a fully integrated coherent receiver (ICR) 889. In one example of operation, a discrete ECL light 876 is split by an optical power splitter 803 with one half propagating to receiver side comprising ICR 889 and the other half propagating to transmitter side. On the transmitter side, ECL light 876 is further split with an optical power splitter 805 and modulated by two I/Q modulators 806 and 807. The polarization of the two modulated lights is then rotated with PSRs 891 and 892 such that the two modulated lights have different polarity, before each modulated light enters a first port P1 of optical circulator 801 or 802. The light emerging from a second port P2 of optical circulators 801 and 802 are then combined by a PSR 804, having a dual polarization, and transmitted to FDCO transceiver 809 using fiber 877.

On the receiver side, ICR 889 may include variable optical attenuators (VOA) 819, optical power splitters 813, 815, and 817, and photodetectors 811. Dual polarized received light from FDCO transceiver 809 is split into two single polarized light by PSR 804, and each polarized light enters second port P2 of optical circulators 801 or 802. Single polarized lights after emerging from a third port P3 of optical circulators 801 and 802 enter ICR 889. In embodiments, in ICR 889, the lights interfere with the local-oscillator (LO) in two 90° hybrids and propagate to eight photodetectors 811, which subsequently converts the received light into electrical signals.

In photonic integration, photodetectors 811 may be formed of silicon-germanium alloy, which is infrared sensitive, and may be fully integrated on a SOI substrate. Modulators 806 and 807 and ICR 889, which may be formed of different materials such as InP or silica planar lightwave circuit (PLC), may also be integrated using hybrid integration along with optical circulators (e.g., optical circulators 801 and 802) by adding mode size converter designs on the waveguide coupling interfaces.

Integrated ECL

Another critical component in an OFFT is an ECL, such as parent laser 150 in FIGS. 1A and 1B, which is as a high-quality narrow-linewidth light source. Typically, a commercial ECL consists of multiple discrete components such as etalon filters, InP gain chips, end mirrors, optical isolators, and microlenses. Fabrication and packaging cost for such discrete devices may be very high. However, integrated ECL design disclosed herein improves upon the existing ECL by fabricating parts of chip-scale ECL on a hybrid silicon photonics platform that may be used in an OFFT.

Figure 9:
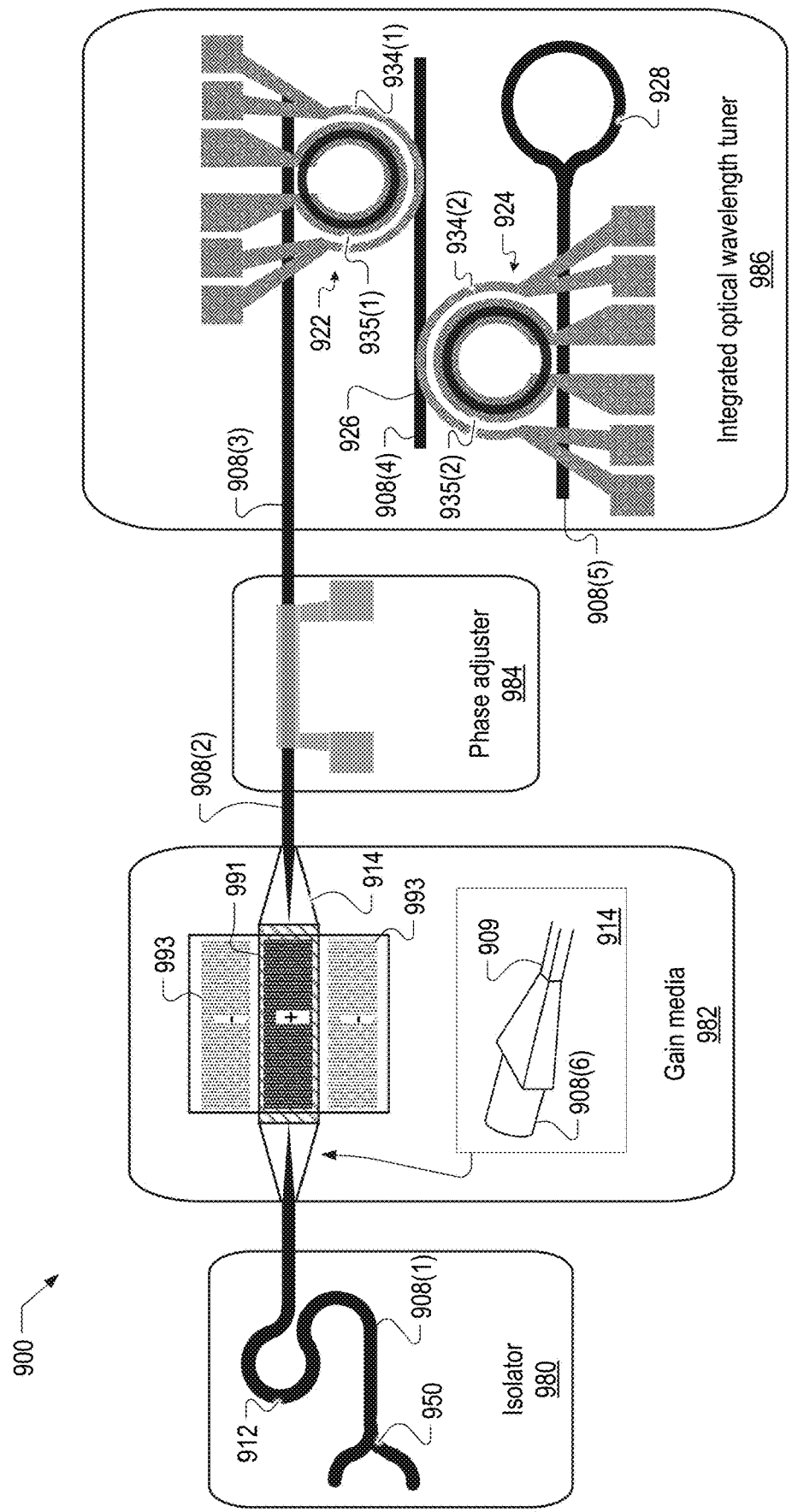
FIG. 9 shows a schematic of an integrated external cavity laser, in an embodiment.

FIG. 9 shows a schematic of an integrated ECL 900. Integrated ECL 900 includes a plurality of silicon waveguides patterned on a surface of a SOI substrate, shown in thick dark lines in FIG. 9. The plurality of silicon waveguides includes loop-mirrors 912 and 928, and an output optical coupler 950. Integrated ECL also includes an isolator 980, an optical phase adjuster 984, an integrated optical wavelength tuner 986, and a gain media 982. Gain media 982 includes an integrated III-V chip on the surface of the SOI substrate. Integrated optical wavelength tuner 986 includes silicon ring resonators 922 and 924, an optical bus 926, metal heaters 935, and RTDs 934. Silicon ring resonators 922 and 924 are examples of silicon ring resonator 236. Metal heaters 935 are examples of metal strip 235, and RTDs 934 are examples of metal strip 234. Integrated optical wavelength tuner 986 utilizes a ring-bus-ring design, which provides stable lasing, reliable wavelength tuning, and high side-mode-suppression ratio. Wide wavelength tuning may be achieved by utilizing the Vernier effect in the silicon ring resonators. Similar to optical circulator 200 in FIGS. 2A and 2B, metal heaters 935 and RTDs 934 may be formed of Ti/Pt thin film and are patterned above silicon ring resonators 922 and 924 for thermal tuning and temperature sensing. Integrated optical wavelength tuner 986 may also include waveguide loop-mirror 928, which functions as a back-reflector mirror for integrated ECL 900.

In fabricating integrated ECL 900, most of the parts of the chip-scale ECL, including loop-mirrors 912 and 928, tapered patterns 914, phase adjuster 984, and integrated optical wavelength tuner 986 may be fabricated on a SOI substrate using standard CMOS processes. Passive silicon waveguides 908 are first patterned on the SOI substrate. The fabrication of active region in gain media 982 then follows through the heterogenous integration of III-V material on silicon. The III-V chip, typically of InGaAsP/InP multi-quantum well (MQW) structures, may be bonded on top of the SOI substrate using direct wafer bonding, or using organic material such as DVS-benzo cyclobutene (BCB). The InP MQW chip is then thinned down and etched by chemical selective etching and reactive ion etching (RIE). For low loss coupling between the active region in gain media 982 and passive silicon waveguides 908, three-dimensional tapered patterns, such as tapered pattern 914 may be utilized in both vertical and lateral directions. Tapered pattern 914 shows a coupling where both InP active region 909 and silicon nano-wire waveguide 908(6) are tapered for coupling. Eventually metal electrodes 991 and 993 are patterned on both P and N doped region of gain media 982. For dual polarization OFFT design, a 3-dB coupler made of silicon waveguide may be integrated at output optical coupler 950. When integrated ECL 900 is directly coupled to an integrated optical circulator (e.g., optical circulator 202 in FIG. 2C), no coupling structures or spot size converter (SSC) design is required at output optical coupler 950. However, for other application scenarios, additional SSCs may be required for fiber coupling.

Integrated Optical Phase Modulator

A phase modulator, such as phase modulators 168 in FIGS. 1A and 1B, is another critical part of the OFFT system. The OFFT system requires the phase modulator to have (i) low drive voltage, (ii) large bandwidth, (iii) low insertion loss, (iv) high extinction ratio, and (v) compatibility with large-scale manufacturing. To meet the requirements, materials such as Lithium Niobate (LN) may be used, which exhibit a linear change of its refractive index in response to an applied electric field. However, phase modulators based on LN tend to be large and are difficult to integrate. An alternative method is to utilize an LN thin film bonded on a SOI substrate and create LN waveguides by dry etching to achieve optical confinement, which results in improved electro-optic efficiencies and performance. Embodiments disclosed hereinbelow illustrate phase modulators that meet the requirements listed above and may be included in an OFFT, such as OFFTs 100 and 101 in FIGS. 1A and 1B, by photonic integration.

FIGS. 10A and 10B illustrate one phase modulator 1200, with an integrated LN layer. Phase modulator 1200 may for example be used as phase modulators 168 of FIGS. 1A and 1B. FIG. 10A shows a top view of phase modulator 1200, which is parallel to x-y plane and denotes a section line 1298, which indicates the location of the orthogonal cross-sectional side view illustrated in FIG. 10B, which is parallel to x-z plane. FIGS. 10A and 10B are best viewed together in the following description. Phase modulator 1200 includes a LN thin film 1220 bonded on a surface of a SOI substrate 1234, a pair of metal electrodes 1212 and 1214 deposited on a top surface of LN thin film 1220. LN thin film 1220 has a protrusion 1221 between the pair of metal electrodes 1212 and 1214. Protrusion 1221 has a height that does not exceed a height of the pair of metal electrodes 1212 and 1214. Phase modulator 1200 also includes an insulating layer 1236 that covers the LN thin film 1220 and an area between the protrusion 1221 and the pair of metal electrodes 1212 and 1214, such that the pair of metal electrodes 1212 and 1214 are accessible for an external electrical contact.

SOI substrate 1234 may include a $SiO_2$ layer 1232 on a Si layer 1231. Protrusion 1221 may be formed by first patterning through standard photolithography, followed by Art-based ion-milling process to etch halfway through the thickness of LN thin film 1220. Metal electrodes 1212 and 1214, which may be formed of Ti/Au or Al, are then produced through a metal deposition/evaporation and liftoff process. Insulating layer 1236, which may be a $SiO_2$ layer, is deposited by plasma-enhanced chemical vapor deposition (PECVD) and followed by etching of contact windows 1213 and 1215. With the high index contrast of 0.7 between protrusion 1221 and insulating layer 1236, phase modulator 1200 may achieve low-driving voltage, high bandwidth, and a relatively small footprint in millimeter scale. Advantageously, when integrated with other devices, the coupling between LN waveguide, such as protrusion 1221, and silicon waveguide used in a silicon photonics-based devices (e.g., optical circulator 200 of FIGS. 2A and 2B) may result in a low loss coupling by adding a SSC at the coupling.

Figures 11A, 11B:
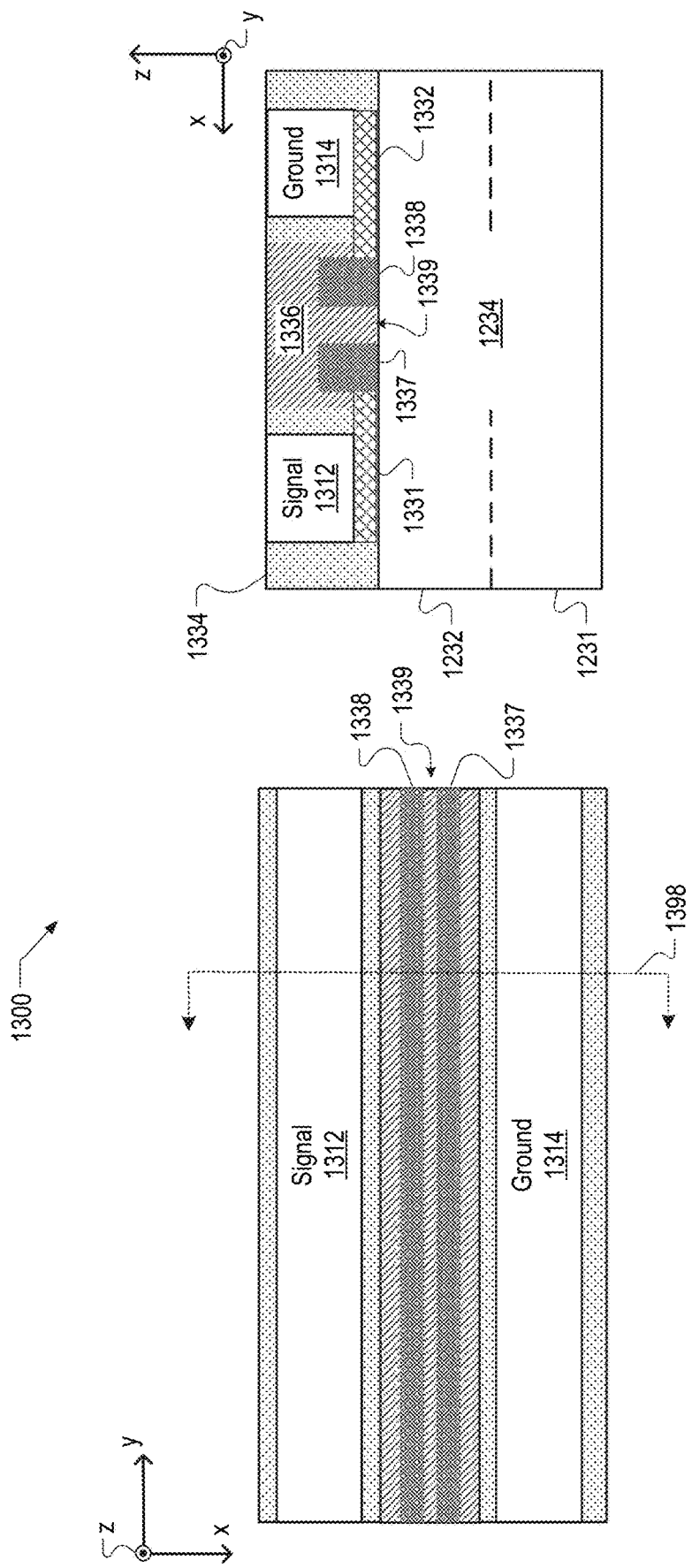
FIGS. 11A and 11B illustrate another phase modulator, based on silicon-organic-hybrid technology, in an embodiment.

FIGS. 11A and 11B illustrate another phase modulator 1300, based on silicon-organic-hybrid technology. FIG. 11A shows a top view of phase modulator 1300, which is parallel to x-y plane and denotes a section line 1398, which indicates the location of the orthogonal cross-sectional side view illustrated in FIG. 11B, which is parallel to x-z plane. FIGS. 11A and 11B are best viewed together in the following description. Phase modulator 1300 may for example be used as phase modulators 168 of FIGS. 1A and 1B. Phase modulator 1300 includes two n-doped silicon optical rails 1337 and 1338, an electro-optic polymer layer 1336, two n-doped silicon slabs 1331 and 1332, a $SiO_2$ layer 1334, and a pair of metal electrodes 1312 and 1314. N-doped silicon optical rails 1337 and 1338 are bonded on a surface of a SOI substrate 1234 and includes two separate substantially parallel waveguides. SOI substrate 1234 may be a $SiO_2$ layer 1232 on a Si layer 1231. Electro-optic polymer layer 1336 covers a top surface of and in-between the two n-doped silicon optical rails 1337 and 1338. N-doped silicon slabs 1331 and 1332 are patterned on the surface of SOI substrate 1234 and are electrically coupled to n-doped silicon optical rails 1337 and 1338, respectively. Metal electrodes 1312 and 1314 are electrically coupled to n-doped silicon slabs 1331 and 1332, respectively. N-doped silicon optical rails 1337 and 1338 are waveguides separated by a slot 1339. In embodiments, the width of slot 1339 is in the range of 100 nm to 200 nm.

Electro-optic polymer layer 1336 may be either spin-coated or dispensed. In embodiments, electro-optic polymer layer 1336 is formed from one of organic electro-optic materials DLD-164, SEO100, and SE0250. The refractive index of electro-optic polymer layer 1336 is directly modulated by an electric field applied between the two n-doped silicon optical rails 1337 and 1338. Modulating electric field is generated by applying a drive voltage to metal electrodes 1312 and 1314, which are connected to silicon optical rails 1337 and 1338 via n-doped silicon slabs 1331 and 1332. Phase modulator 1300 uses silicon-organic-hybrid (SOH) technology to achieve low driving voltage and high bandwidth. By combining the conventional SOI waveguides with highly efficient organic electro-optic material, SOH Mach Zehnder Modulator (MZM) with a π-voltage of 1.6 V may generate a channel with 16 quadrature amplitude modulations (QAM) at 100 GHz. Advantageously, phase modulator 1300 may be fabricated on a standard SOI platform and may therefore share the same substrate with other silicon photonics-based devices (e.g., optical circulator 200 of FIGS. 2A and 2B). With the change in optical confinement in the slot waveguide, a coupler such as SSC may be required when coupling to an integrated optical circulator to ensure low loss optical coupling.

Figure 12B:
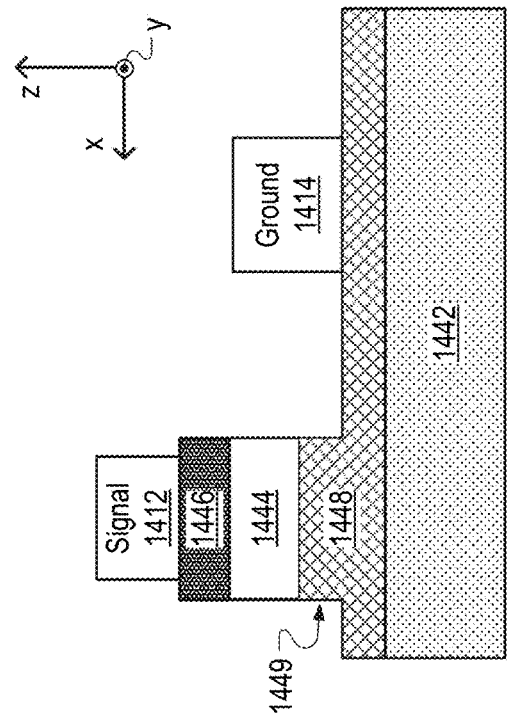
FIGS. 12A and 12B illustrate another phase modulator, with an integrated Indium Phosphide layer, in an embodiment.
Figure 12A:
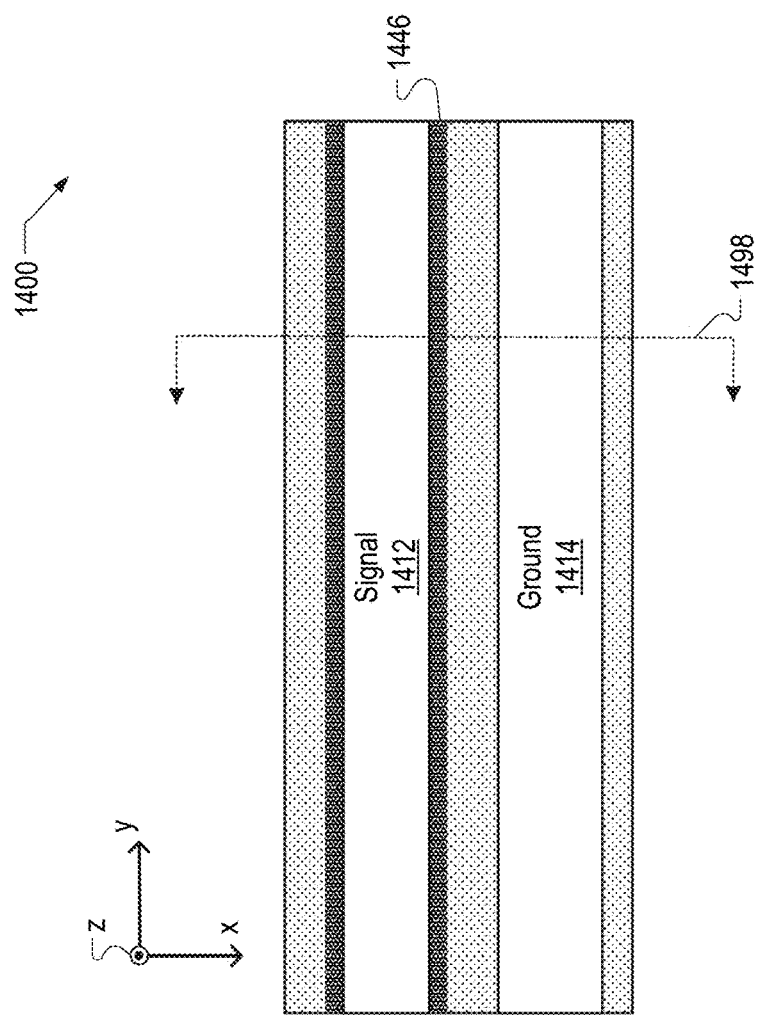

FIGS. 12A and 12B illustrate another phase modulator 1400, with an integrated InP layer. FIG. 12A shows a top view of phase modulator 1400, which is parallel to x-y plane and denotes a section line 1498, which indicates the location of the orthogonal cross-sectional side view illustrated in FIG. 12B, which is parallel to x-z plane. FIGS. 12A and 12B are best viewed together in the following description. Phase modulator 1400 also may for example be used as phase modulators 168 of FIGS. 1A and 1B. Phase modulator 1400 includes an n-doped InP layer 1448, a waveguide 1444, a p-doped InP layer 1446, and a pair of metal electrodes 1412 and 1414. N-doped InP layer 1448 is bonded on a surface of a SOI substrate 1442 and has a protrusion rail 1449. Waveguide 1444 is an undoped MQW layer is deposited on protrusion rail 1449. P-doped InP layer 1446 is deposited on waveguide 1444. Pair of metal electrodes 1412 and 1414 has one metal electrode 1412 electrically coupled to p-doped InP layer 1446, and another metal electrode 1414 electrically coupled to the n-doped InP layer 1448.

Phase modulator 1400 is based on another organic electro-optic material, InP, for the high modulation bandwidth, low drive voltage and compact size. The material InP MZM may exhibit a 3-dB electro-optic bandwidth of over 67 GHz, a it-voltage of 1.5V, and an on-chip loss of 2 dB. SOI substrate 1442 may be a Si—InP layer. The layering of p-doped InP layer 1446, the undoped MQW layer as waveguide 1444, and protrusion rail 1449 in n-doped InP layer 1448 forms a p-i-n configuration. Waveguide 1444, which is used as a waveguide, may be formed of InGaAlAs and InAlAs.

Figure 13:
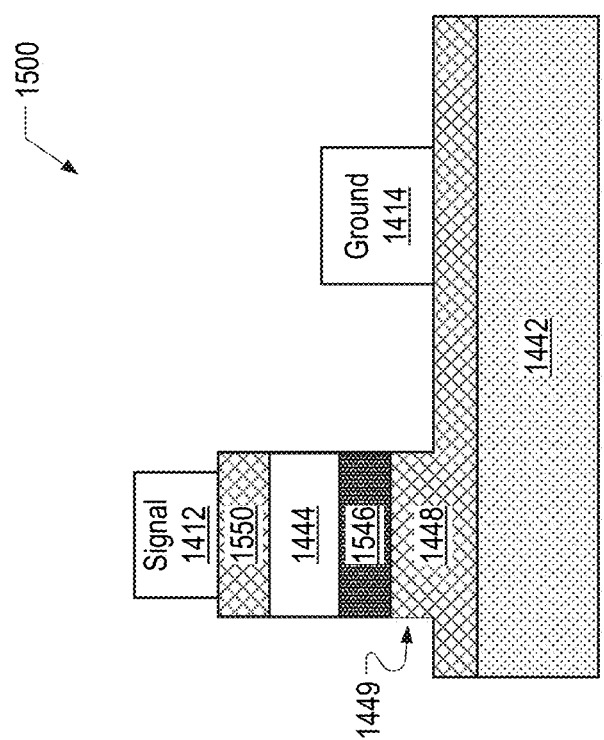
FIG. 13 illustrates an alternate phase modulator to the phase modulator of FIGS. 12A and 12B.

In an alternate example of phase modulator 1400, the modulation bandwidth may be improved further by replacing p-doped InP layer 1446 with an n-doped InP layer. FIG. 13 illustrates an alternate phase modulator 1500 to phase modulator 1400 of FIGS. 12A and 12B. Phase modulator 1500 is based on phase modulator 1400 and may for example be used as phase modulators 168 of FIGS. 1A and 1B. Phase modulator 1500 includes n-doped InP layer 1448, a p-doped InP layer 1546, waveguide 1444, an n-doped InP cladding layer 1550, and pair of metal electrodes 1412 and 1414. N-doped indium phosphide (InP) layer 1448 is bonded on a surface of SOI substrate 1442 and has a protrusion rail 1449. P-doped InP layer 1546 is deposited on protrusion rail

1449. Waveguide 1444 is an undoped MQW layer deposited on p-doped InP layer 1546. N-doped InP cladding layer 1550 is deposited on the waveguide 1444. Pair of metal electrodes 1412 and 1414 has one metal electrode 1412 electrically coupled to n-doped InP cladding layer 1550, and another metal electrode 1414 electrically coupled to n-doped InP layer 1448. The layering arrangement for phase modulator 1500 follows an n-i-p-n heterostructure, where p-doped InP layer 1546 acts as a current flow blocker to enable voltage applying across waveguide 1444. Similar to previous examples of phase modulators, low loss coupling to an integrated optical circulator (e.g., optical circulator 200 of FIGS. 2A and 2B) may be achieved by using a coupler such as SSC at the coupling.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An optical full-field transmitter (OFFT), comprising:
   a plurality of optical circulators fabricated on a silicon-on-insulator (SOI) substrate, each of the optical circulators having:
   (a) a first port that optically couples to a high-quality optical source;
   (b) a second port that optically couples to a child laser configured to receive amplitude modulation data; and
   (c) a third port that optically couples to a phase modulator (i) configured to receive a phase modulation data and (ii) including an output port that outputs amplitude and phase modulated light; and
   a polarization beam combiner that receives the amplitude and phase modulated light from each of the optical circulators and that outputs combined amplitude and phase modulated light.

2. The OFFT of claim 1, wherein the child laser comprises a Fabry-Perot laser diode integrated on the SOI substrate.

3. The OFFT of claim 1, further comprising:
   a plurality of parent lasers integrated on the SOI substrate, each of the parent lasers generating the high-quality optical source, optically coupled to one first port of one optical circulator.

4. The OFFT of claim 1, further comprising:
   a parent laser integrated on the SOI substrate for generating the high-quality optical source; and
   an optical power splitter having an input port that receives an output light from the parent laser and a plurality of output ports, each of the output ports optically coupling to one first port of one optical circulator.

* * * * *